(12) United States Patent
Xiao et al.

(10) Patent No.: US 9,471,657 B1
(45) Date of Patent: *Oct. 18, 2016

(54) RANGE QUERY CAPACITY ALLOCATION

(71) Applicant: Amazon Technologies, Inc., Reno, NV (US)

(72) Inventors: Wei Xiao, Kirkland, WA (US); Miguel Mascarenhas Filipe, Seattle, WA (US); Bjorn Patrick Swift, Seattle, WA (US); Kiran-Kumar Muniswamy-Reddy, Seattle, WA (US); Stuart Henry Seelye Marshall, Seattle, WA (US); Timothy Andrew Rath, Seattle, WA (US); Rande A. Blackman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 173 days.

This patent is subject to a terminal disclaimer.

(21) Appl. No.: 13/898,253

(22) Filed: May 20, 2013

(51) Int. Cl.
*G06F 7/00* (2006.01)
*G06F 17/30* (2006.01)

(52) U.S. Cl.
CPC .............. *G06F 17/30575* (2013.01)

(58) Field of Classification Search
None
See application file for complete search history.

(56) References Cited

U.S. PATENT DOCUMENTS

| | | | |
|---|---|---|---|
| 6,564,212 B2 | 5/2003 | Koskas | |
| 7,647,329 B1 * | 1/2010 | Fischman et al. | 707/999.1 |
| 7,680,761 B2 | 3/2010 | Zait et al. | |
| 7,921,087 B2 | 4/2011 | Uppala | |
| 7,984,043 B1 * | 7/2011 | Waas | 707/718 |
| 8,074,107 B2 * | 12/2011 | Sivasubramanian et al. | 714/6.3 |
| 8,150,870 B1 * | 4/2012 | Peddy | G06F 17/30584 707/770 |
| 8,386,463 B2 * | 2/2013 | Bestgen | G06F 17/3053 707/713 |
| 8,386,540 B1 | 2/2013 | McAlister et al. | |
| 8,392,482 B1 | 3/2013 | McAlister et al. | |
| 8,793,250 B1 * | 7/2014 | Gorde | G06F 17/30309 707/737 |
| 9,026,499 B1 * | 5/2015 | Rajimwale | G06F 17/30893 707/674 |
| 9,223,820 B2 * | 12/2015 | Huras | G06F 17/30584 |
| 9,235,578 B2 * | 1/2016 | Asai | G06F 17/30516 |
| 2007/0156842 A1 * | 7/2007 | Vermeulen et al. | 709/217 |
| 2010/0106934 A1 | 4/2010 | Calder et al. | |
| 2010/0191884 A1 * | 7/2010 | Holenstein et al. | 710/200 |

OTHER PUBLICATIONS

U.S. Appl. No. 13/898,201, filed May 20, 2013, Xiao.

* cited by examiner

*Primary Examiner* — Hexing Liu
(74) *Attorney, Agent, or Firm* — Baker & Hostetler LLP

(57) ABSTRACT

Distributed database management systems may perform range queries over the leading portion of a primary key. Non-random distribution of data may improve performance related to the processing of range queries, but may tend to cause workload to be concentrated on particular partitions. Groups of partitions may be expanded and collapsed based on detection of disproportionate workload. Disproportionate write workload may be distributed among a group of partitions that can subsequently be queried using a federated approach. Disproportionate read workload may be distributed among a group of read-only replicated partitions.

20 Claims, 16 Drawing Sheets

RANGE QUERY CAPACITY ALLOCATION

CROSS REFERENCE

This application is related to co-pending application entitled "Range Query Capacity Allocation," U.S. application Ser. No. 13/898,201, filed on even date herewith, which is hereby incorporated by reference in its entirety.

BACKGROUND

A distributed database management system ("distributed DBMS") may maintain a collection of items stored on multiple computing nodes. Each item may be uniquely identified by a primary key. The primary key may be composed of two portions, a leading portion sometimes referred to as a hash key, and a trailing portion sometimes known as a range key. The leading portion, or hash key, may be used to locate a computing node on which an item is stored. The range key may be used to perform queries over a range of items stored on the computing node indicated by the hash key. A query of this type may apply to all items having the same hash key value. The applicable set of items may also be limited by applying a filter to the items' range key values.

The distributed DBMS may use various schemes to randomize the placement of items across multiple computing nodes, while still allowing the node on which an item is stored to be located using a hash key. Random distribution of items may improve the performance of read and write operations because the workload related to processing the read and write operations would tend to be evenly distributed across the multiple computing nodes. Range queries made over a range key may remain efficient because all items with a particular hash key value are located on the same computing node.

Range queries might also be performed over hash key values. However, if items are randomly distributed between computing nodes, a range query over hash key values may be inefficient because items having similar hash key values might be widely distributed. Non-random distribution of the items may improve the performance of range queries, but may lead to hotspots in which workload is overly concentrated on particular computing nodes.

BRIEF DESCRIPTION OF DRAWINGS

The drawings provided herein are designed to illustrate example embodiments and are not intended to limit the scope of the disclosure.

DETAILED DESCRIPTION

Figure 1A:
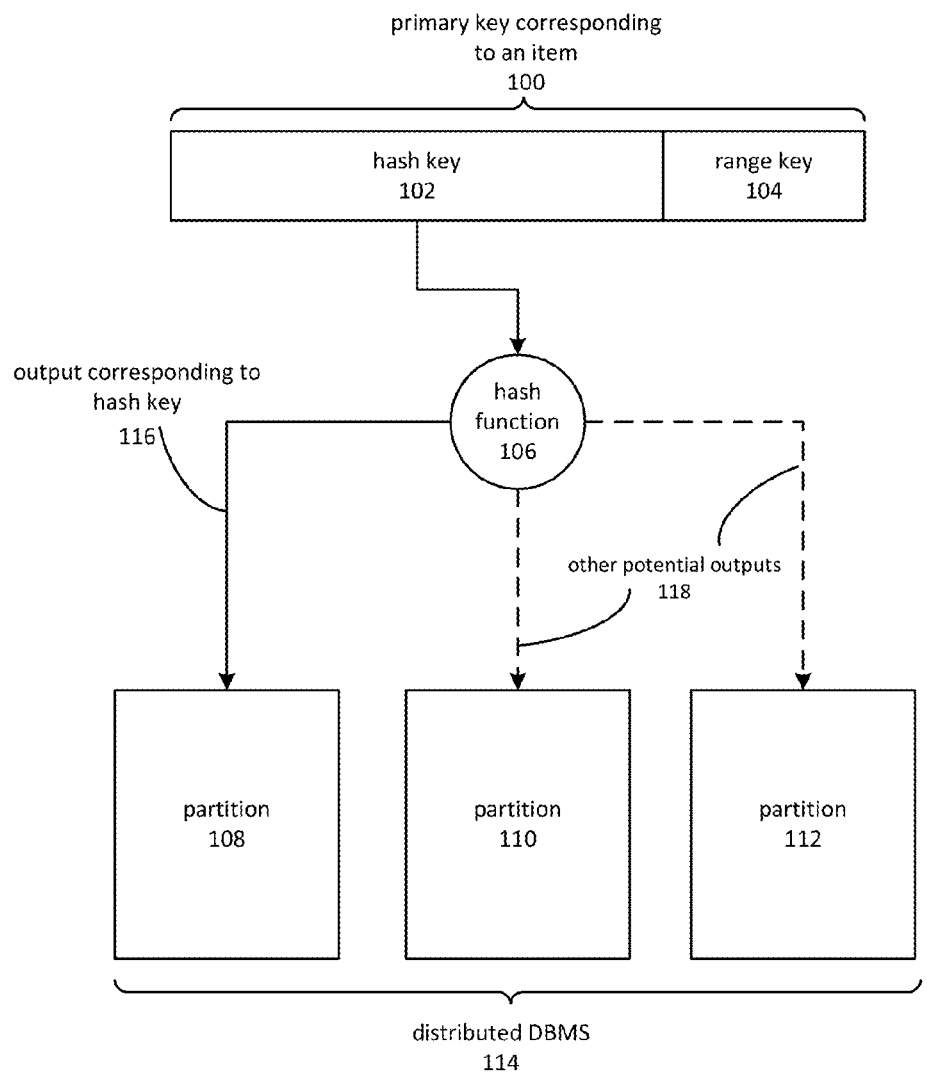
FIG. 1A is a block diagram depicting an embodiment of a distributed DBMS employing a hash and range key function to access data partitions corresponding to computing nodes.

A distributed DBMS may maintain data organized by tables, each of which contains a set of items. The items may each comprise a set of name value pairs, a set of values identified by column names, or undefined values. In various embodiments, individual items may not conform to any particular schema, and each item may accordingly contain a different number of values, each of which may have a different logical meaning and type. Values that have the same logical meaning and type, such as those identified by the same name or column, may for convenience be referred to as columns. Other embodiments of a DBMS may enforce particular structural requirements, such as row and column format, uniqueness constraints, primary and foreign key relationships and the like. Examples of distributed DBMSs include key-value databases, relational databases, non-structured query language ("NoSQL") databases, object-oriented databases and so forth.

The items in a table may be identified by primary key values. Each primary key value, taken as a whole, uniquely identifies an item stored in the table. To access an item, a client of the distributed DBMS may issue a request that includes a primary key value that corresponds to that item. Embodiments may also support access using secondary keys, which may not necessarily correspond to precisely one item in a table.

Primary keys may be defined when the table is created. A description of the primary key may be stored with other aspects of the table's schema, which may include any required columns, constraints on values and so forth. For the primary key, schema may include a description of the length and value of a primary key. For example, a primary key might be defined as a 256-bit binary value, or as a variable-length string of characters.

The primary key may also be defined as having an internal structure. Although in some embodiments a primary key's structure may consist only of a single value, embodiments may support or require that the primary key comprise a composite of two or more values. For example, one form of primary key divides the key into two portions, a hash key and range key. Together, these portions of the primary key may reflect or define hierarchical relationships within a collection of items. A hash key may identify a group of items within the hierarchy while a range key identifies specific items within the group.

Primary keys may also be used in a distributed DBMS in conjunction with partitioning. In order to support large volumes of data and high workload demands, distributed DBMSs may support partitioning the data in a table over a number of computing nodes. Various forms of partitioning may be supported. In horizontal partitioning, each computing node may maintain a subset of the collection of items. In vertical partitioning, data may be divided based on columns or fields, so that each computing node may contain a subset of the columns defined on the table. Some distributed DBMSs may combine these two forms of partitioning.

As used herein, the terms horizontal and vertical partitioning refer to a division of a dataset consistent with the preceding paragraph. Embodiments may host each horizontal or vertical partition on a separate computing node. The term partition, as used herein, generally refers to a horizontal or vertical partition hosted on a computing node. The terms fan-out partition, non-voting member and replication partner, as used herein, refer to subcategories of partitions.

One method of horizontal partitioning involves applying methods of distributing data between various computing nodes in a random or semi-random fashion. FIG. 1A depicts one such method. Primary key 100 comprises hash-key component 102 and range-key component 104. Random or semi-random distribution of data across computing nodes 108, 110 and 112 may improve performance of distributed DBMS 114. Accordingly, an item may be stored on one of computing nodes 108, 110 and 112 based on application of hash function 106 to hash-key component 102.

Hash function 106 may be computer code that translates a primary-key value to another value, such as an integer, in what may be described as a key space. The hash function 106 may be configured to translate input primary values to a semi-random point in the key space, in which a given input value translates to the same point in the key space on each invocation of the function. A given hash function may map to a finite set of points, or buckets, within the key space. In various embodiments, hash function 106 may cluster mappings around certain points. For some hash function, this may occur when input values are similar. The skewing may degrade performance because it may result in an uneven distribution of items on a particular computing node. One approach to preventing this problem is to use a hash function that maps to a large number of discrete points within the key space. Regions of key space can then be assigned to computing nodes. Alternatively, regions of key space can be assigned to an intermediate data structure that refers to a computing node. Different regions may be mapped to the same computing node or intermediate data structure.

Returning to FIG. 1A, hash key 102 of primary key 100 may be supplied as an input value to hash function 106. For a given value of hash key 102, application of hash function 106 produces output corresponding to hash key 116. The output of hash function 106 is constant for a given input value. Application of other values to hash function 106 may produce other potential outputs 118, but the results for any given input value are consistent. The consistent output 116 may be used to determine where to initially store the item that corresponds to primary key 100. In addition, because the output of hash function 106 is consistent for given input values, hash key 102 may be applied to hash function 106 to determine where an item was previously stored.

While a table can be split into multiple horizontal partitions, each horizontal partition may be replicated between computing nodes so that the same item, or a version of the same item, is stored on more than one computing node. In more general terms, the same horizontal partition may be hosted on more than one computing node. This may improve the availability of the system, because if one of the computing nodes becomes unavailable another computing node having the replicated data may be able to step in and take its place. Replication may improve the scalability of the system by allowing load to be shared among multiple computing nodes.

Consistency between replicated partitions may be maintained using a technique that involves quorum or consensus between the replicated partitions. Embodiments may require quorum only among currently active computing nodes, which may improve availability because it does not require all of the computing nodes to be online.

In some embodiments, quorum may involve determining that a minimum number of computing nodes participate in a read or write operation. For read operations, at least the minimum number of computing nodes must respond to a request to read an item. Because data is not necessarily replicated immediately, it may be the case that two given computing nodes will have different values for the same item. If so, some embodiments may return each version of the data, along with information descriptive of the version. For write operations, quorum may involve the minimum number of computing nodes acknowledging the success of a write operation. For example, if three computing nodes share replicated data, a write operation might be required of two of the three computing nodes. Embodiments may impose different quorum requirements based on the type of operation involved. For example, write operations may involve a higher threshold number of computing nodes in order to achieve quorum.

Figure 1B:
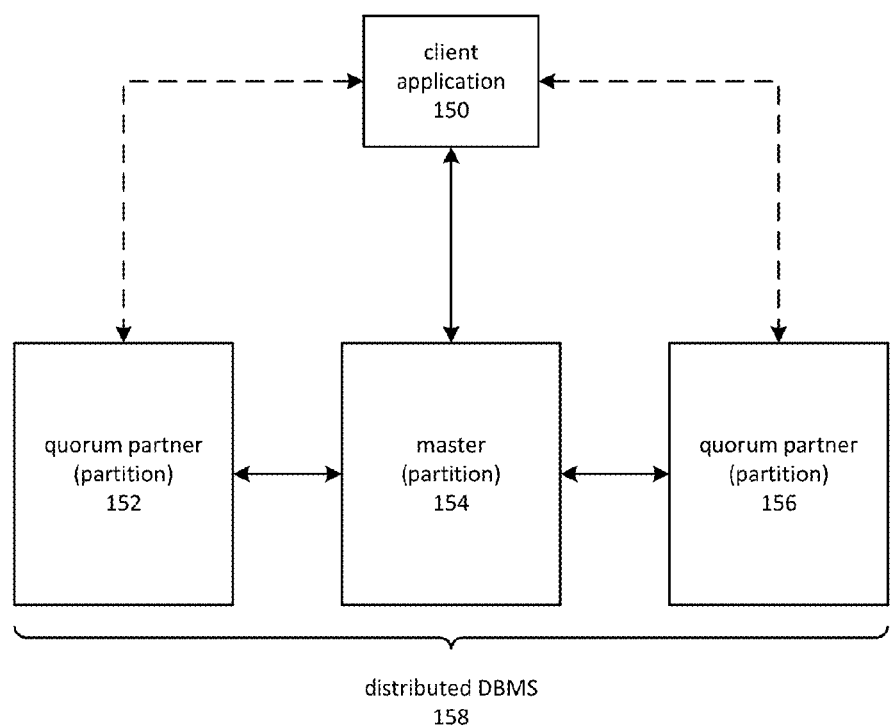
FIG. 1B is a block diagram depicting and embodiment of a distributed DBMS in which operations are performed on a set of partitions participating in quorum-based transactions.

FIG. 1B depicts embodiment of a distributed DBMS 158 as comprised of a master 154 and quorum partners 152 and 156. Each of this may be hosted on a separate computing node, and may also be located within a separate data center. A client application 150 may issue requests to perform various operations on the master partition, such as reading or writing data. Some embodiments may use the same master for all operations, while other embodiments may allow any of the computing nodes to serve as the master. Upon receipt of the request, master 154 secures the involvement of quorum partners 152 and 156. The number of quorum partners to be involved may depend on the number required for quorum. Alternatively, master 154 may determine quorum to be present based on involvement of a majority of quorum partners that are currently operational. Once the request has been successfully processed on a sufficient number of computing nodes, as required for quorum, the results of the operation may be returned to client application 150.

Embodiments may allow for client application 150 to perform operations on quorum partners 152 and 156. In an embodiment, queries that are compatible with eventual consistency may be directed to quorum partner 152 or quorum partner 154. Quorum partners 152 and 156 may not have data that is fully consistent with the current state of items stored on the master. However, some applications are indifferent to this situation and may send requests to quorum partners 152 or 156.

A distributed database may support a wide variety of operations. Non-limiting examples include put operations, which involve storing or updating items, and read operations, which involve retrieving values corresponding to an item. Both operations may supply primary key values for use by the distributed DBMS in identifying the item. Another example of an operation that may be supported by some embodiments is a range query. A range query involves returning a span of items conforming to some set of fixed criteria. For example, a distributed DBMS might contain a table of items containing address information, from which a client wishes to retrieve all items corresponding to a particular zip code. In a distributed DBMS that employs a hash function to randomly distribute data using the leading portion of a primary key, range queries may not be efficient if the leading portion of the primary key is fixed. A range may apply to numerous ways in which data may be ordered, such as time series, alphabetical order, numerical order, ordinal position and so forth.

Figure 2:
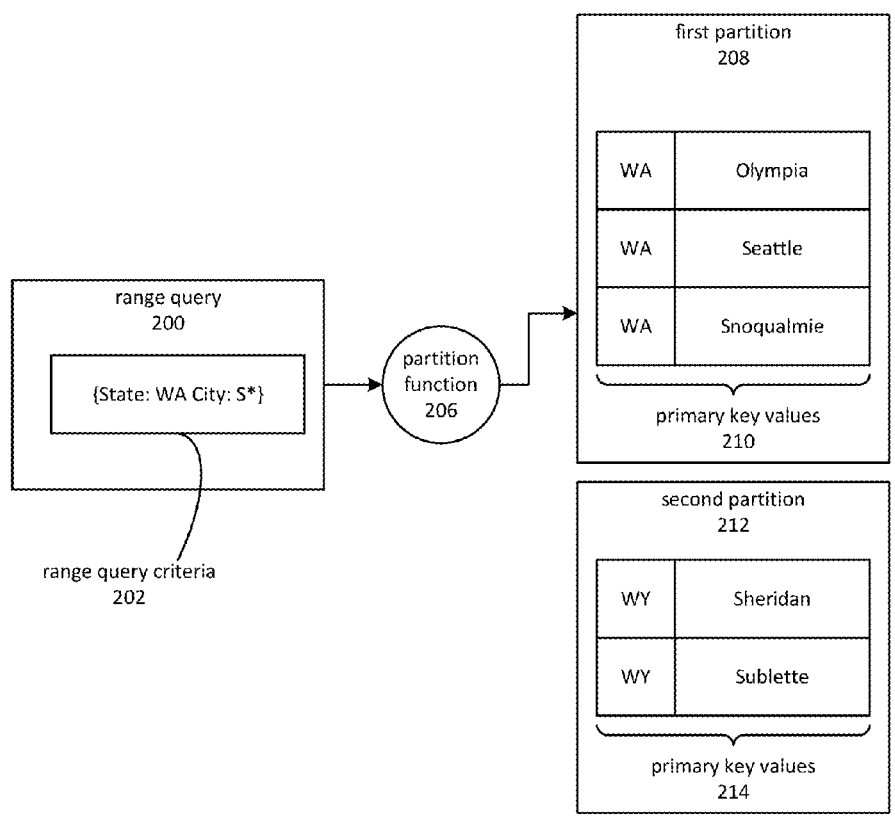
FIG. 2 is a block diagram depicting an embodiment for performing a range query using a range key portion of a primary key.

FIG. 2 is an illustrative example depicting processing of a range query 200. A distributed DBMS may accept a range query in which one or more portions of a primary key are searched in a range query. In the example of FIG. 2, a table has been partitioned into two partitions. First partition 208 contains items having primary key values 210. Second partition 212 contains items having primary key values 214. Range query criteria 202 specifies a range of items having a state of "WA" and a city beginning with "S." The depicted query therefore involves a fixed leading portion of the primary key and a variable portion of the second.

Applying the leading portion of the primary key specified in range query criteria 202 to partition function 206 may refer to first partition 208. Once first partition 208 has been located, the remainder of range query criteria 202 may be applied. In FIG. 2, first partition 208 could be scanned while applying the "S*" criteria supplied as the value of range key criteria 202. The results of the depicted range query might therefore be items {state: "WA", city: "Seattle"} and {state: "WA", city: "Snoqualmie"}.

In FIG. 2, the assignment of items having {state: "WA"} to first partition 208 and items having {state: "WY"} to second partition 212 may have been based on random factors. However, performance of range queries may be made more efficient by assigning items to partitions based on non-random factors. Continuing the example of FIG. 2, a composite primary key might consist of a state abbreviation and a city. The state abbreviation could be considered to be the leading portion of the primary key. Ranges of state abbreviations may be assigned to partitions, such as assigning "WA" and "WY" the same partition. This approach may allow for more efficient searches on all states beginning with the letter "W."

Figure 3:
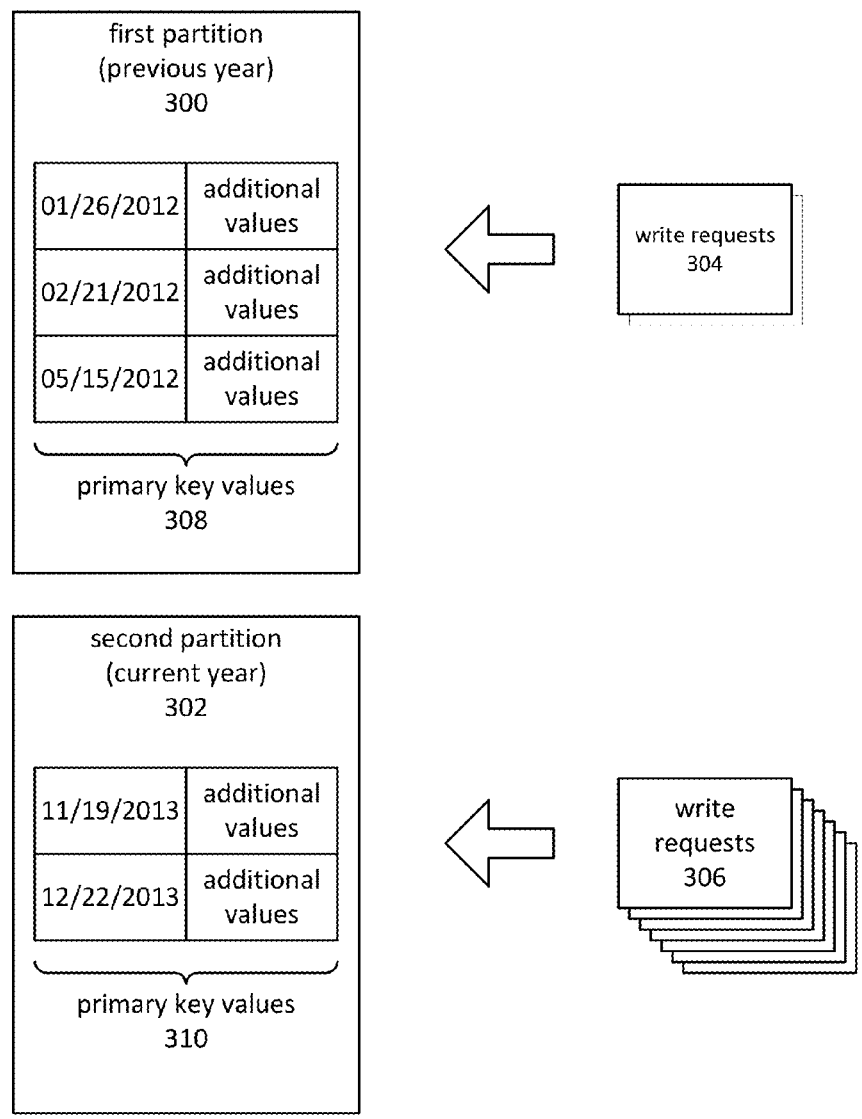
FIG. 3 is a block diagram depicting write operation hotspots for data partitioned according to a natural ordering of the data.

However, assigning items to a partition in a non-random order may create hotspots that negatively impact efficiency. FIG. 3 provides an example. In the example, the leading portion of primary key values 308 and 310 are depicted as containing date information, while the remaining portion contains additional information which, combined with the leading portion, uniquely identifies items in a partitioned table. A first partition 300 contains items having date information corresponding to the previous year, and a second partition 302 contains items whose date information indicates that it belongs in the current year. Write requests 304 involving the first partition may be relatively infrequent due to the age of the data. On the other hand, write requests 306 involving the second partition 302 may be relatively frequent. For example, if the table contained data describing a retail store's sales record, for typical usage patterns it is likely that most of the data added to the existing data would be recent. Older data might be added occasionally, but less frequently than the current day's data.

A hotspot may be defined as a computing node, network component, storage device and so forth on which capacity utilization is clustered. The term hotspot may also be associated with over-utilization of resources. In a distributed DBMS, hotspots may be associated with throughput measurements. Throughput may be measured in terms of a number of operations, transactions and so forth performed per unit of time. Throughput may also be measured in terms of an amount of data returned or received during the course of processing read or write operations. Hotspots may, however, be associated with numerous other measures of capacity utilization such as central processing unit ("CPU") utilization, network bandwidth consumption, memory consumption and so forth.

Hotspots may occur with many different types of data, and tend to be most problematic when the data is organized according to a natural order. For example, log files, sales records and other data organized by date would tend to have hotspots at or near the end of the table when the table is ordered by date. Similarly, a table of names sorted alphabetically would tend to have hotspots around groups of common names.

Hotspots may be placed into at least two general categories: read hotspots and write hotspots. The basic characteristics of read and write hotspots are similar, though the former results from reading data and performing range queries and the latter results from adding new data to a table. As described herein, issues caused by read and write hotspots may be addressed by different techniques.

Figure 4:
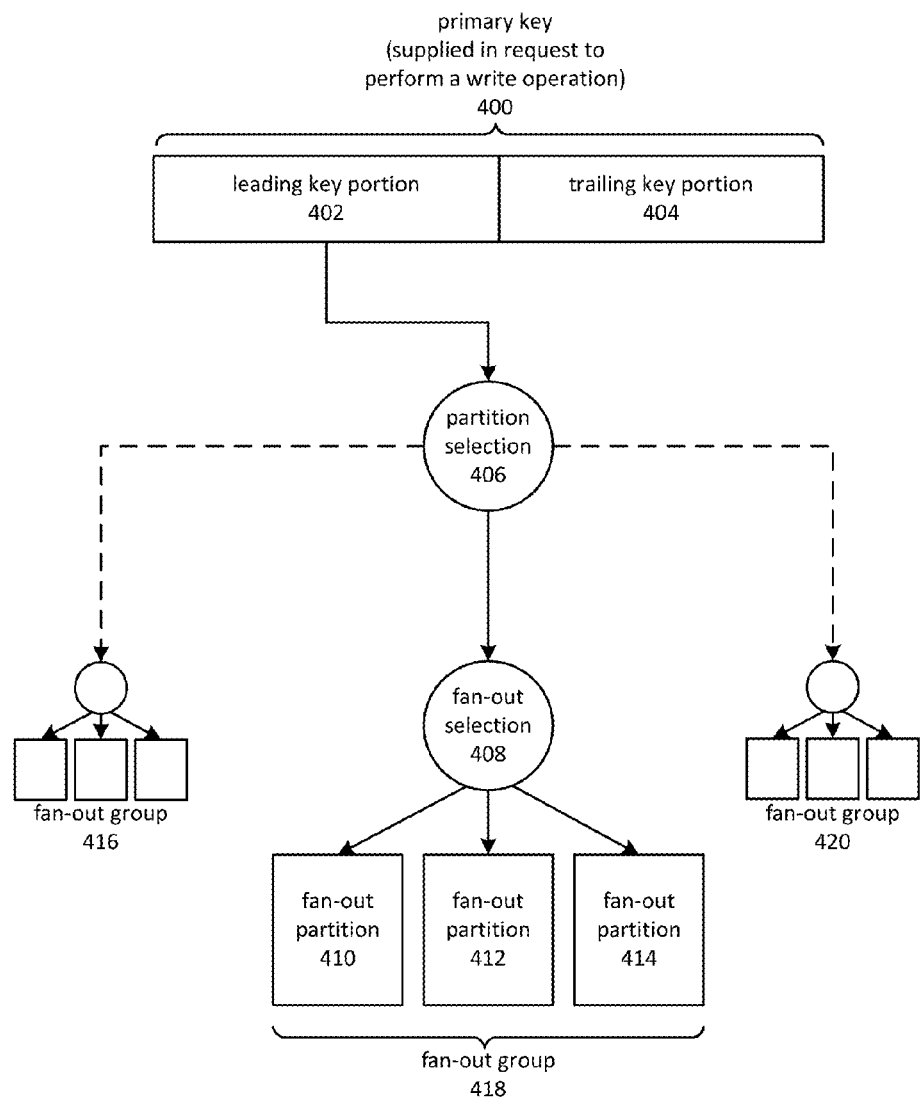
FIG. 4 is a block diagram depicting an embodiment for adding fan-out partitions to a fan-out group as a means of balancing workload related to write operation hotspots.

Natural ordering may be used by a distributed DBMS to support queries over a range of primary key values, even though the use of natural ordering may create hotspots. In an embodiment, such as the example embodiment depicted in FIG. 4, a fan-out system may be employed to process write operations in a manner that reduces potential performance and scalability issues associated with write hotspots. A primary key 400 may be supplied in a request to perform a write operation adding a new item to the distributed DBMS. The primary key 400 may be a composite primary key comprising a leading key portion 402 and a trailing key portion 404. In various instances, the primary key may be a value consisting only of leading key portion 402.

Leading key portion 402 may be applied to partition function 406 to determine a destination fan-out group for storing the new item. The destination partition may be selected based on a placement appropriate for performing range queries. Appropriate placement may comprise grouping items based on a natural ordering of the leading portion of the table's primary keys, of which leading key portion 402 is one instance. A fan-out group, such as fan-out groups 416, 418, and 420, may each comprise one or more fan-out partitions that share workload related to performing write operations. For example, fan-out group 418 may be comprised of fan-out partitions 410, 412 and 414.

Fan-out groups 416, 418, and 420 may initially contain a single member, which may be described as a primary partition or simply as a partition. However, the terms fan-out group and fan-out partition may also be used to refer to a primary partition whether or not it has been associated with additional fan-out members.

Partition function 406 may comprise various computer-implemented functions, algorithms, subroutines and so forth. In some embodiments partition function 406 may comprise a computer-implement function that maps between a leading portion of a primary key and a key-space, in a manner that consistently returns the same output for a given input. Other embodiments may maintain records of previous partition assignments, so that the output may remain consistent if the same input is subsequently supplied to partition function 406.

Write operation workload may be distributed among members of a fan-out group, such as fan-out group 418 which comprises primary partition 410 and fan-out partitions 412 and 414. Workload may be distributed based on the operation of fan-out function 408, which may assign an item to one of primary partition 410, fan-out partition 412 or fan-out partition 414 based on a variety of factors. A round-robin approach may be employed by some embodiments. Although fan-out 408 is depicted as an element separate from partition function 406, the two functions may be combined into an integrated whole, or combined with other modules or units of functionality.

Figure 5:
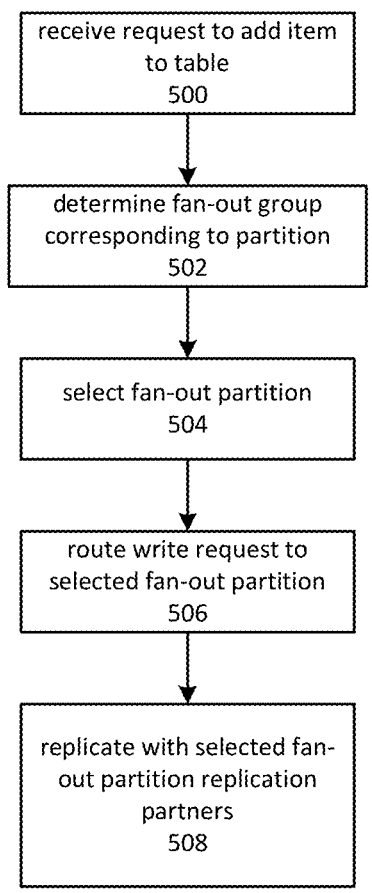
FIG. 5 is a flowchart of an embodiment for adding an item to a fan-out group by selecting a fan-out partition from within the group.

FIG. 5 depicts an embodiment of a process for adding an item to a distributed DBMS using a fan-out technique. Although depicted as a series of operations, those of ordinary skill in the art will appreciate that the depicted operations are intended to be illustrative and may be altered, omitted, reordered or performed in parallel.

At operation 500, a request is received to add an item to a table maintained by a distributed DBMS. The table may be divided into one or more partitions, each of which may be associated with a fan-out group comprising a computing node hosting the primary partition and zero or more additional computing nodes hosting fan-out partitions. A fan-out group corresponding to the primary partition may be determined, as depicted by operation 502, based on a number of factors such as the leading portion of a primary key, co-location of data likely to be targeted by a range query, evenness of data distribution and so forth.

A member of the selected fan-out group may be assigned to store the item, as depicted by operation 504. The selected member may be the original partition of the fan-out group or one of the other fan-out partitions. Items may be assigned to members of the fan-out group so that each member ideally shares an equal portion of the workload. At operation 506, the item may be stored on the selected fan-out partition Operation 508 depicts replicating data. In various embodiments, data is not replicated between members of the fan-out group because doing so could increase workload demand on any particular partition in proportion to the total workload demands being placed on the fan-out group. Instead, for improved reliability each member of the fan-out group may be associated with its own set of replication partners.

Figure 6:
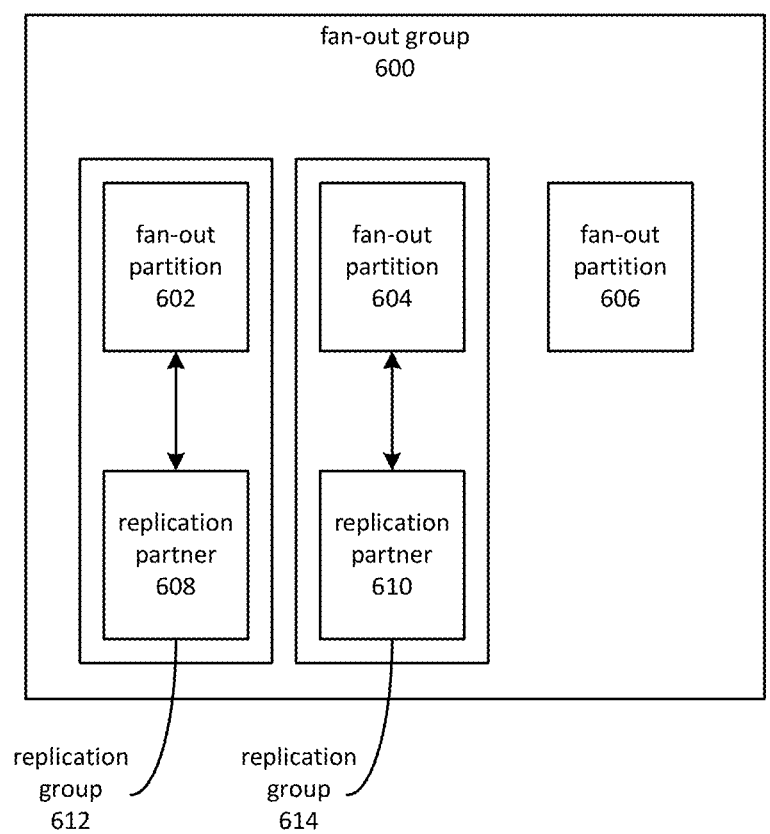
FIG. 6 is a block diagram depicting an embodiment for performing replication within a fan-out group.

FIG. 6 depicts an example of associating members of a fan-out group with replication partners. Within fan-out group 600, fan-out partition 602 is paired with replication partner 608 as part of replication group 612. Both fan-out partition 602 and replication partner 608 may be hosted on separate computing nodes and may be located in different data centers. Fan-out partition 604 is similarly associated with replication partner 610 in replication group 614. In various embodiments, members of a replication group such as 612 or 614 may be configured to participate in quorum-based commits.

Although FIG. 6 depicts replication groups 612 and 614 having two computing nodes each, other embodiments may employ more or fewer replication partners. As depicted by fan-out partition 606, a fan-out partition might be configured to have no replication partners. However, omitting replication partners may be associated with availability and reliability risks.

Because writes may be directed at individual fan-out partitions, a query directed to an individual fan-out partition might fail because the required item is not present, even when the required item is available on another fan-out partition in the same group. Accordingly, a federated approach to queries may be used.

Figure 7:
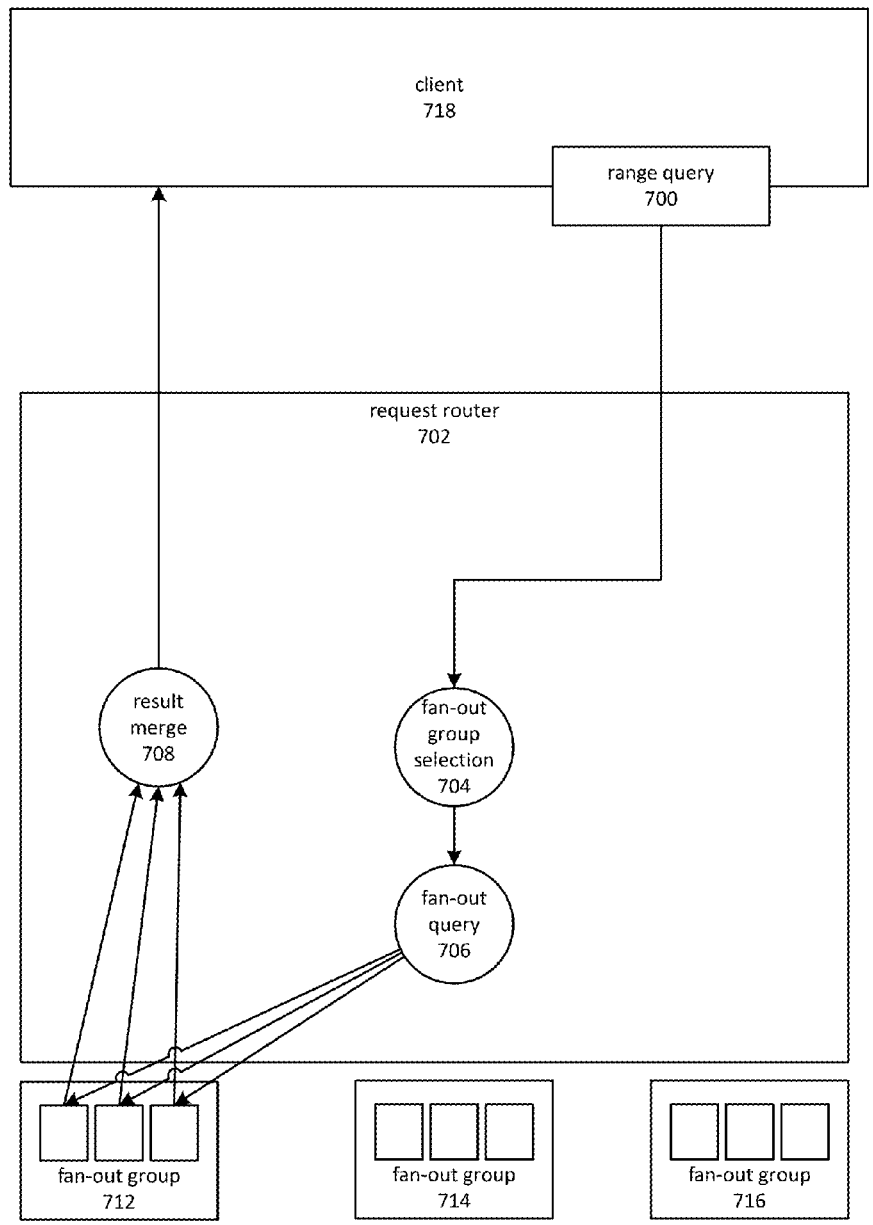
FIG. 7 is a block diagram depicting an embodiment of performing range queries on a fan-out group.

FIG. 7 depicts an embodiment for performing a range query 700 on a distributed DBMS having three fan-out groups 712, 714, and 716. A request router 702 component of the distributed DBMS may receive a request to perform a range query 700. The range query 700 may be comprised of criteria corresponding to a range query over the leading portion of a primary key. For example, range query 700 might contain a subset of the leading portion of a primary key value.

A fan-out group selection 704 function may be employed to determine a fan-out group, corresponding to a primary partition and associated fan-out partitions, on which the desired range query should be performed. The fan-out group selection 704 function may comprise various computer-implemented functions, algorithms, subroutines and so forth, and may function similarly to the partition selection 406 function depicted in FIG. 4 and described herein. However, for performing range queries embodiments may configure fan-out group selection 704 to locate a fan-out group corresponding to the range query's criteria, which as noted may be a subset of the leading portion of a primary key, rather than the entire leading portion used by the partition selection 406 function depicted in FIG. 4. For illustrative purposes, FIG. 7 depicts fan-out group selection 704 function mapping criteria supplied in range query 700 to fan-out group 712. Other range queries might correspond to fan-out group 714 or fan-out group 716.

Because items may not be replicated between fan-out partitions, a range query over the items stored on any one partition may return incomplete results. Fan-out query 706 may request that parallel queries be performed on each of the fan-out partitions of fan-out group 712. Subsequently, a component of request router 702, such as result merge 708, may combine the results of the parallel queries to form an integrated result which can be returned to client 718.

Elements of FIG. 7 such as request router 702, query partition selection 704, fan-out query 706 and result merge 708 may comprise various combinations of executable code, circuitry and so forth capable of performing the operations described herein. Those of ordinary skill in the art will appreciate that the depicted elements may be recombined, rearranged or recast in various ways while remaining consistent with aspects of the present disclosure.

Figure 8:
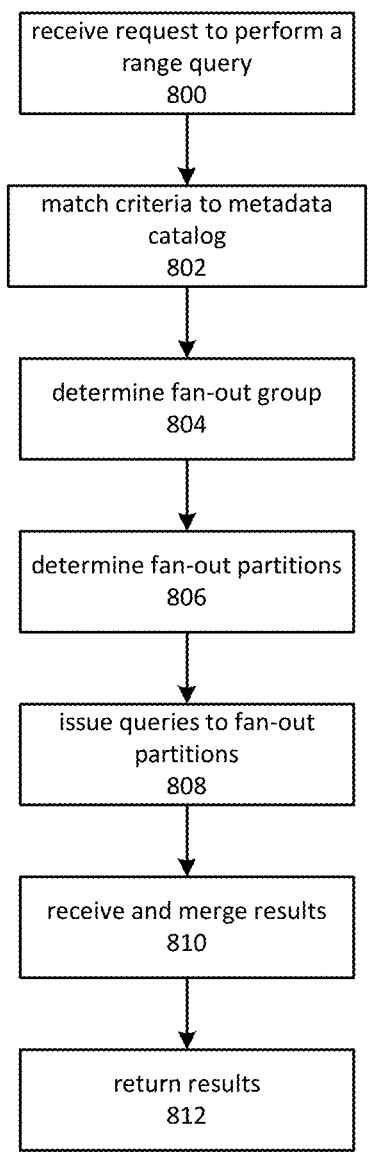
FIG. 8 is a flowchart depicting an embodiment for using a metadata catalog to determine the location of fan-out partitions to perform a range query on a fan-out group.

FIG. 8 is an alternative depiction of an embodiment for performing a range query. Although depicted as a series of operations, those of ordinary skill in the art will appreciate that the depicted operations are intended to be illustrative and may be altered, omitted, reordered or performed in parallel.

At operation 800, a component of a distributed DBMS may receive a request to perform a range query. The range query may include a specification of the query to be performed, including criteria values that describes what range of items to return. The criteria may comprise partial values, search expressions, patterns and so forth that may be applied to primary key values to determine whether or not corresponding items should be included in the results. Embodiments may also allow criteria to apply to other portions of the item.

One approach to selecting a partition involves use of a metadata catalog. A metadata catalog may contain various entries containing definitions and information related to the schema, structures and layout of a distributed DBMS. Embodiments may maintain information describing partition assignments, fan-out partitions, replication partners and so forth. When a request to perform a range query has been received, operation 802 may be performed to determine what fan-out groups and fan-out partitions should be involved in processing the query. The determination may be partly based on information contained in the metadata catalog which maps between leading primary key portions and fan-out groups, and between fan-out groups and fan-out partitions. The leading key portions in the map may be evaluated against a pattern specified in criteria included in the range query received at operation 800. The result of the evaluation may be a list of fan-out groups and fan-out partitions that should participate in processing the range query. Obtaining these values is depicted by operations 804 and 806.

The aforementioned operations may be performed by a database component such as request router 702, depicted in FIG. 7. At operation 808, a component such as request router 702 may issue a range query to each of the indicated fan-out partitions. Each fan-out partition may evaluate the range query criteria against items stored on it. The resulting set of items may then be merged with other item sets from the other fan-out partitions, forming a unified result set. This is depicted by operation 810. At operation 812, the result set may be returned to the client that invoked the request.

Some types of operations may specify a finite set of items to be retrieved. Embodiments may support these types of operations using the techniques just described. In addition, embodiments may also query the fan-out partitions in an order corresponding to the number of items stored on each partition. In more general terms, probabilities of the required items being present on a particular fan-out partition may be employed to determine a search order.

Embodiments may also employ a Bloom filter to exclude fan-out partitions not having the requested items and to determine the likelihood that the remaining fan-out partitions do contain the requested items. When a write operation is processed, a Bloom filter may be updated once a fan-out partition has been selected to process the write. When a read operation is being processed to retrieve the corresponding item, a Bloom filter may be queried. The results of querying the Bloom filter may then be applied to determine an order in which the fan-out partitions may be searched. Various other methods may be employed to establish the probability of an item being stored on a particular node. These techniques may be applied to fan-out groups for both read and write processing.

The amount of workload processed by a fan-out partition may be inversely proportional to the number of fan-out partitions in the corresponding fan-out group. Accordingly, the number of fan-out partitions may be increased to accommodate increased workload. Various techniques described herein may be employed to detect increased workload and add fan-out partitions to a fan-out group.

Fan-out partitions may be added to a fan-out group based on various metrics collected during operation or testing. Various non-limiting examples of metrics include CPU utilization, network bandwidth utilization, disk queue length, throughput measurements, transactions per unit of time, amount of data returned per unit of time and so forth. In general, metrics such as these may be used to determine overall workload processed by the fan-out group, and to determine fan-out partitions subject to write hotspots.

An additional fan-out partition may be warranted when the various metrics indicate that the average workload for the entire table has risen above a threshold level. Embodiments may compare the workload processed by each fan-out group to determine how workload is distributed. When workload is evenly distributed across all groups, additional fan-out partitions may be added to each group to accommodate extra workload. However, an alternative approach involves repartitioning the table to include additional fan-out groups (as opposed to adding fan-out partitions to fan-out groups).

In other cases, a fan-out partition may be added to a particular fan-out group due to the presence of a hotspot. As explained herein, write hotspots may occur in conjunction with writing data to partitions that are based on a natural ordering of the data. When a write hotspot occurs, a particular fan-out group may be subject to a disproportionate amount of workload. Accordingly, a fan-out partition may be added to a fan-out group when a write hotspot is detected. One method of detecting a write hotspot is to determine that workload processed by a single fan-out group is more than the average workload processed by all of the fan-out groups.

Figure 9:
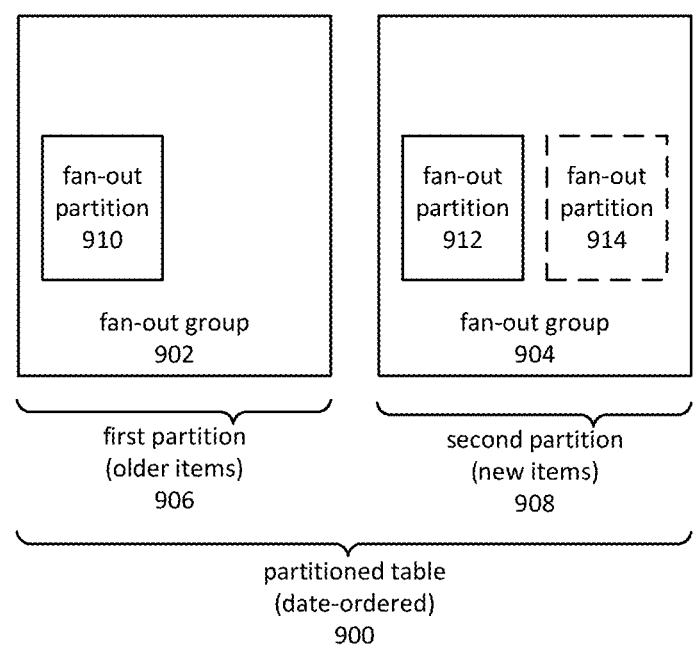
FIG. 9 is a block diagram depicting addition of a new fan-out partition to a fan-out group in response to detecting a write hotspot.

FIG. 9 is an illustrative example adding a fan-out partition due to write hotspot detection. In the depicted example, a partitioned table 900 is naturally ordered by date. A first partition 906 contains items prior to a certain date, and a second partition 908 contains items subsequent to that date. The first partition 906 corresponds to fan-out group 902, and the second partition 908 corresponds to fan-out group 904. Prior to write hotspot detection, fan-out group 902 contains a single fan-out partition 910 and fan-out group 904 contains a single fan-out partition 912.

As explained herein, time-ordered data is one example of naturally ordered data that tends to be subject to write hotspots. In the example of FIG. 9, fan-out group 904 contains newer items and might therefore be subject to a write hotspot. If a write hotspot is detected, an additional fan-out partition 914 may be added to fan-out group 904.

Continuing the example of FIG. 9, it may be the case that, as new items are added, the amount of data maintained by fan-out group 904 grows to the point where repartitioning table 900 is warranted. If so, a third partition, corresponding to a third fan-out group, may be added to accommodate new items. The third fan-out group, containing the newest items, may be subject to a write hotspot while fan-out group 904 becomes comparatively cool. Embodiments may reduce the number of fan-out partitions in fan-out group 904 through a merge process, as described herein.

Fan-out partitions may also be added to fan-out groups on the basis of a predictive model. The predictive model may incorporate factors such as the type of data represented by the items to be stored in the table, the natural order of the data, the number of partitions, the rate at which new items are added, the distribution of new items and so forth. Output of the model may comprise aspects such as a forecasted write hotspot location, forecasted workload, a number of fan-out partitions needed to process the forecasted workload and so forth. Embodiments may predict workload corresponding to a particular forecasted write hotspot.

A predictive model may be selected by a customer of a distributed DBMS service. The distributed DBMS may maintain a table on behalf of the customer. Various client applications may access the table, generating workload. A certain amount of capacity utilization, or workload, may be provisioned to the customer's table based, for example, on how much the customer is paying for the service. Various controls may be imposed to prevent over-utilization.

Figure 10:
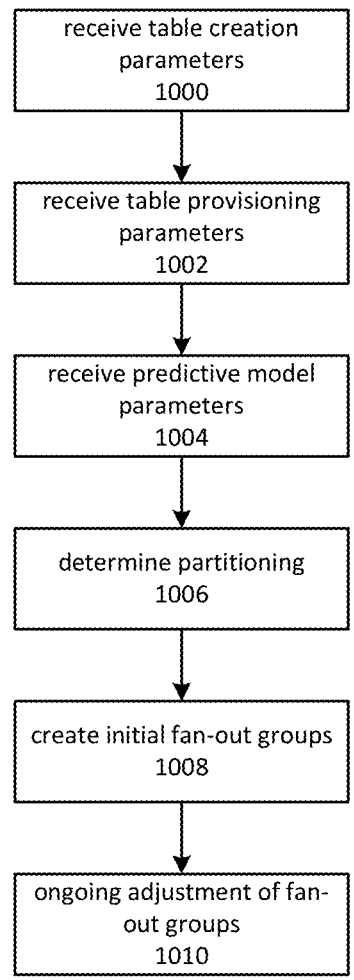
FIG. 10 is a flowchart depicting an embodiment for creating fan-out groups and adjusting the fan-out groups on an ongoing basis, using table creation parameters, table provisioning parameters, and a predictive model.

The customer of the distributed DBMS may select a predictive model for addition and subtraction of fan-out partitions when a table is initially created. The customer may also select a model subsequent to table creation, or modify the parameters of an existing model. FIG. 10 depicts a process for creating and maintaining an initial set of fan-out groups and maintaining them on an ongoing basis, using a predictive model or other techniques. Although depicted as a sequence of operations, those of ordinary skill in the art will appreciate that the depicted operations may be altered, omitted, reordered or performed in parallel.

Operation 1000 depicts receiving table creation parameters. In general, parameters may be values received from a call to an application programming interface ("API"), received from a user interface program, web page, web service and so forth. The table creation parameters may describe the primary key including a leading first portion on which data may be sorted, as well as various other types of metadata. The table creation parameters may also include estimates of the table's expected initial size and rate of growth. These values may be used to determine an initial number of partitions to allocate for the table.

At operation 1002, table provisioning parameters may be received. These parameters may describe the total amount of capacity to perform operations on the table, and may be based on factors such as a level of service paid for by the customer of the table. Embodiments may allocate a subset of the total capacity to each partition and each partition may enforce utilization of the capacity allocated to it.

Parameters describing the desired predictive model may also be received, as depicted by operation 1004. As described herein, the predictive model may comprise a wide variety of elements such as an expected distribution of new items, the rate at which new items are expected to be added and so forth. The parameters received at operation 1004 may comprise an enumerated value which may be mapped to one of a set of predefined models. For example, a model might be predefined for application to time series data. The customer could then provide, as a parameter, an enumerated value that corresponds to this model.

Operation 1006 depicts determining the initial partitioning of the table. The partitioning may be based at least in part on the various parameters received in operations 1000, 1002 and 1004. This operation involves dividing the items into horizontal partitions and establishing a fan-out group 1008 corresponding to each of the horizontal partitions. Each horizontal partition may comprise a fan-out group. Each fan-out group may comprise one or more fan-out partitions. The number of fan-out partitions in a given fan-out group may be based on the predictive model. For example, a fan-out group corresponding to an expected write hotspot might initially be allocated multiple fan-out partitions, while fan-out groups not expected to be subject to write hotspots might initially be allocated only a single fan-out partition. In addition, the number of fan-out partitions in each group might be adjusted based on the expected overall workload, although embodiments might add additional fan-out groups, rather than fan-out partitions, in this circumstance.

Operation 1010 involves adjusting the fan-out groups on an ongoing basis. The predictive model may be used to adjust the fan-out groups by adding or removing fan-out partitions to existing groups as workload increases or write hotspots are detected, and to add additional fan-out groups when repartitioning is warranted. One manner in which a predictive model may be employed is to add a new fan-out group on a periodic basis to accommodate new items being added to tables containing time series data, log files and so on. The predictive model may also be used to determine which fan-out groups should be collapsed, so that they contain fewer fan-out partitions. For data such as timer series and log files, fan-out groups that will no longer receive new items may be collapsed.

Embodiments may employ techniques to handle read hotspots compared to write hotspots. Like write hotspots, read hotspots may tend to occur when data is horizontally partitioned according to a natural order. However, it may be the case that read operations are distributed differently than write operations, and as a result read hotspots may be located in different positions, within the same data, as write hotspots.

Techniques for handling read hotspots may also take advantage of eventually consistent data processing. Eventual consistency involves a delay in propagating replicated data. Although some applications may require that data read from a distributed database reflect the most recent committed state of the data, other applications do not. For some types of data, it may not be important to an application that the data is entirely current, as long as it eventually becomes up to date. Log files and other types of time series data may belong to this category. For example, a report might be generated on data from the most recently completed time period, rather than the current time period.

When data is partitioned in a random or semi-random order, horizontal partitions may be divided into subpartitions in order to better handle increased workload and to increase storage capacity. However, when data is naturally ordered and support for range queries is desired, further horizontal partitioning may have various drawbacks. Horizontal repartitioning may require movement of data to establish the new partitions. Embodiments may also attempt to keep the number of horizontal partitions relatively small. In addition, read hotspots may be transient in nature, so that if a horizontal partition is created to handle a hotspot, it may no longer be desirable to have the same horizontal partitioning arrangement in the future, when the read hotspot may have moved.

Figure 11:
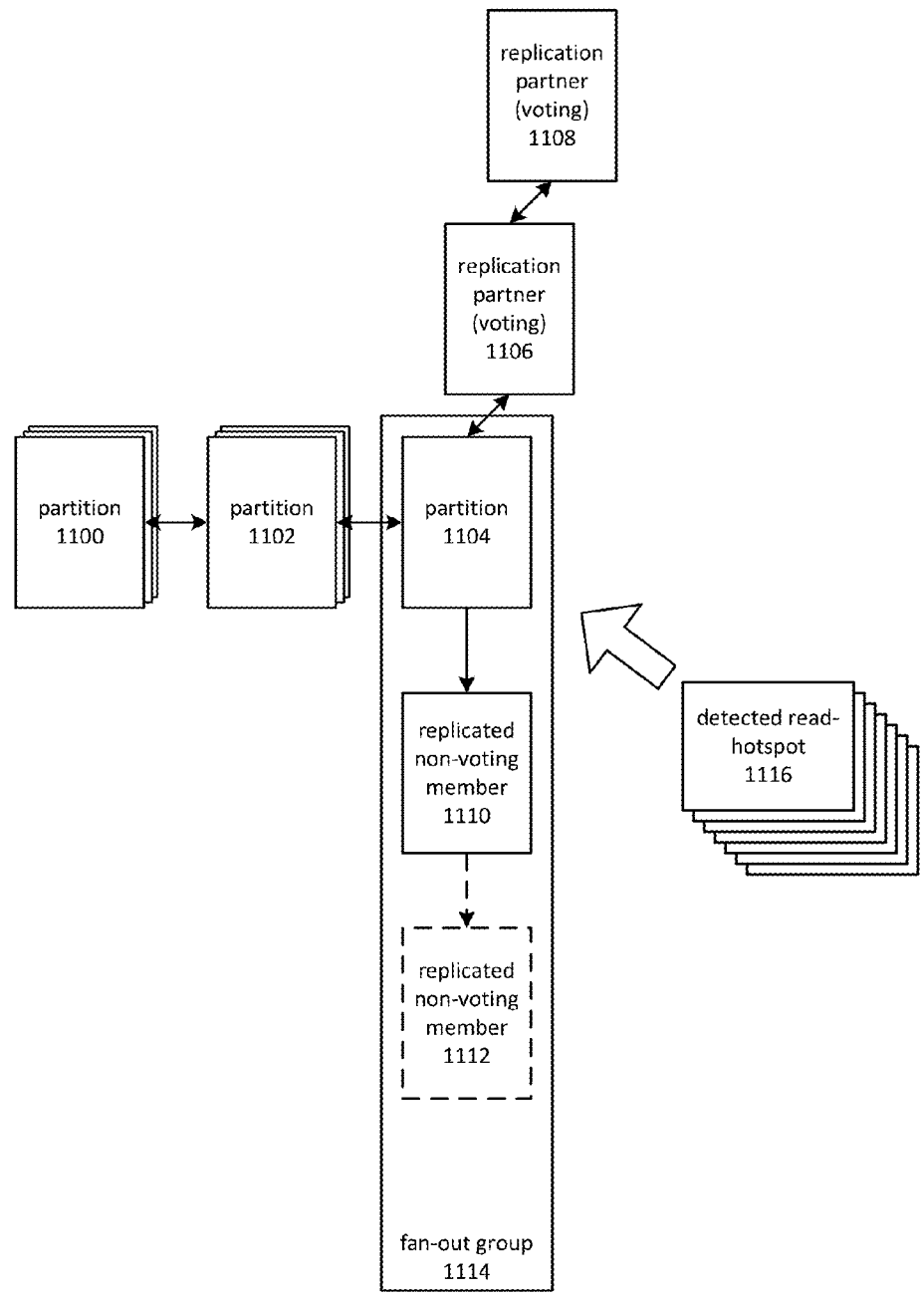
FIG. 11 is a block diagram depicting an embodiment for balancing read operation workload within a quorum membership group.

An embodiment of a technique for redistributing read hotspot workload is depicted in FIG. 11. In the example embodiment, three partitions 1100, 1102 and 1104 correspond to a horizontally partitioned table. Each of the three partitions 1100, 1102 and 1104 may be part of a fan-out group. For example, partition 1104 is paired with replication partners 1106 and 1108, each of which may vote on quorum decisions to determine whether read or write operations should be committed. Accordingly, partition 1104 and replication partners 1106 and 1108 may be considered to also be quorum members with respect to each other. As discussed herein, embodiments may impose different requirements on read versus write quorum decisions, for example by allowing reads based on a single quorum member's decision but requiring a majority for write operations. Any of quorum members 1104, 1106, and 1108 may potentially act as a master. Partitions 1100 and 1102 may be configured in a manner similar to partition 1104.

In response to detecting that partition 1104 is subject to a detected read hotspot condition 1116, representing a concentration of read operations on a logical partition within a table. The system may be configured so that each quorum member may also be associated with one or more non-voting replication partners. For example, partition 1104 may be associated with replicated non-voting member 1110. The combination of a partition such as partition 1104 and one or more non-voting members such as 1110 may be referred to as a fan-out group. For convenience, the term fan-out group may also indicate a partition, such as 1102, to which a non-voting member might be added. Data may be distributed between the members of a fan-out group so that each member of the fan-out group may share in processing read workload initially targeted to partition 1104.

Additional non-voting members may be added to a fan-out group to accommodate read hotspots. For example, based on various factors it may be determined that read operations are concentrated on partition 1104 and the rest of fan-out group 1114. Non-voting member 1112 may then be added to fan-out group 1114. After non-voting member 1112 has stored enough replicated data, it may begin performing read operations and thereby share in the workload being handled by the fan-out group.

If the hotspot were later determined to have moved from partition 1104 and fan-out group 1114, one or more non-voting members such as 1110 and 1112 could be removed from fan-out group 1114. This may be described as collapsing the fan-out group. Embodiments may treat non-voting members 1110 and 1112 as read-only except for replicated data. Fan-out group 1114 may therefore be collapsed without having to merge data back into partition 1104 or any non-voting members remaining in the fan-out group after it is collapsed. Embodiments may chain replication, so that partition 1104 replicates to non-voting member 1110, which in turn replicates to non-voting member 1112. When collapsing a fan-out group, embodiments may drop the non-voting members in the reverse order.

Figure 12:
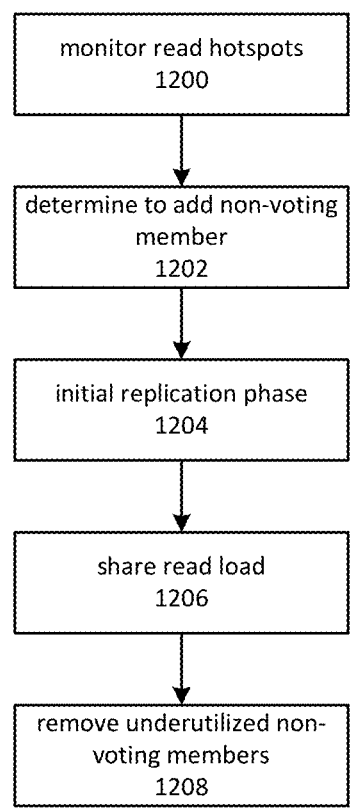
FIG. 12 is a flowchart depicting an embodiment for monitoring read operation workload and adjusting for the workload by adding and subtracting non-voting members.

FIG. 12 depicts an alternative view of an embodiment for managing read hotspots by adding non-voting members to a fan-out group. Although depicted as a sequence of operations, those of ordinary skill in the art will appreciate that the depicted operations may be altered, omitted, reordered or performed in parallel.

Operation 1200 depicts monitoring fan-out groups, including fan-out groups having a partition but no current non-voting members, for workload distribution that is indicative of a hotspot, or otherwise indicative of a need to add non-voting members to a fan-out group. A variety of means may be employed, including those discussed herein regarding write hotspots. Metric-based approaches may be used to determine which fan-out groups, comprising a quorum member and zero or more non-voting members, are experiencing a workload that is excessive or above the average of workload handled by other quorum members. Various metrics may be employed in this determination, including metrics that are not directly reflective of workload, such as response times. Operation 1200 might also involve applying a predictive model on an ongoing basis, possibly based on an indication in the model that read hotspots recur with regularity within a horizontal partition corresponding to a particular fan-out group.

Some embodiments may monitor for hotspots and issue notifications to a customer based on detected hotspots, or on previous hotspots that have moved or tailed off. The notifications may for example describe the current partitioning scheme, the distribution of work across the partitions or fan-out groups and so forth. A notification might also include observations of workload patterns, as well as suggestions of modifications to the partitioning scheme, provisioning level and so forth. The distributed DBMS or other operational systems may be configured to accept input from the customer in response to a hotspot notification, so that fan-out groups may be expanded or collapsed based on the customer's desired configuration. The aforementioned notifications may be employed regarding both read and write hotspots.

The monitoring depicted by operation 1200 may result in a determination, at operation 1202, that a new non-voting member should be added to a fan-out group, based on various factors such as those just described. After the non-voting member has been added, it may enter an initial replication phase, depicted by operation 1204, in which data is transferred from one or more other members of the fan-out group. Some embodiments may perform replication using the chaining approach described previously.

Once data has been at least partially transferred to the new non-voting member, that non-voting member may begin contributing to read workload processing, as depicted by operation 1206. Workload related to processing read operations, including range queries, may be distributed among the fan-out group. A variety of techniques may be employed to process the workload. The techniques employed may be based at least in part on the amount of data which has been replicated to the new non-voting member. If the majority of the data has been replicated, an entire request may be processed on a single member of a fan-out group. Among the members of a fan-out group, if all members contain the same set of replicated data, a member may be selected to process a request to read an item or perform a range query based on randomly selecting a member or using a round-robin approach. In some embodiments, data may be replicated across the entire range of data but individual items may be temporarily absent. These embodiments may employ a chained approach, in which members are queried successively until the item is found. Embodiments may query members in the reverse order in which data is replicated.

If only a portion of the data has been replicated, a federated approach to processing the read operation may be employed. Embodiments may analyze the request to determine the range of items involved in the query, and limit participation to those members (both voting and non-voting) of the fan-out group that contain the necessary data. The federated approach is analogous to horizontal partitioning. Replication to a non-voting member may either proceed in stages based on range, or be purposefully limited to a range of data. If so, the non-voting members may be treated as if they hosted a horizontal partition corresponding to a subset of data held on their parent partition.

Monitoring of workload may continue using various techniques, such as those discussed regarding operation 1200. It may be the case that the number of non-voting members in a fan-out group may be reduced, based at least in part on the amount of workload being handled. Embodiments may, in cases such as this, remove any underutilized non-voting members as depicted by operation 1208. In various embodiments the non-voting members may be designated as read-only in the sense that they do not accept requests to store new items. If so, the fan-out group may be collapsed by ceasing to route read requests to one or more of the non-voting members, and possibly removing the computing node on which the non-voting member operated, or reallocating the computing node to some other purpose.

The amount of workload, or work, handled by partitions or fan-out groups may be compared to determine which partitions or fan-out groups are currently subject to a hotspot. Essentially similar timeframes may be compared. For example, measurements might be collected that indicate that a fan-out group appears to be subject to a high workload. Shortly thereafter, or during a comparable timeframe, the workload of a second fan-out group might be collected. If the first fan-out group's workload is disproportionally higher, it may currently be subject to a hotspot. A comparable timeframe may involve one or more of overlapping timeframes, timeframes of similar duration, and timeframes from comparable periods of overall system demand.

Another aspect of responding to read hotspots involves determining potential split points within the data. If a hotspot is detected, various techniques may be applied to determine a split point for horizontally partitioning the data. A split point may be defined as a position within an ordered set of data, such that data on one side of the split point is assigned to a first horizontal partition, while data on the other side of the split point is assigned to a second horizontal partition. Once a split point has been located, additional non-voting members may be added as partitions of the data.

Figure 13:
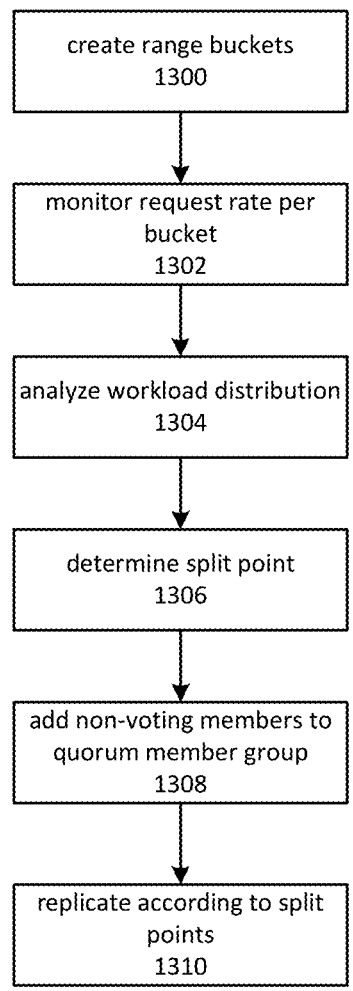
FIG. 13 is a flowchart depicting an embodiment for determining split points based on hotspot determinations.

FIG. 13 depicts an embodiment of a process for locating a split point and adding one or more non-voting members to a fan-out group, so that the non-voting members can contain horizontal partitions based on the split point. Operation 1300 depicts initializing a data structure representative of range buckets. A range bucket may represent work performed on a region of a naturally ordered set of items. At operation 1302, the rate of read operations performed on a partition may be measured. When a read operation occurs, a count associated with the bucket may be incremented. Each count may represent workload being processed by the partition for the corresponding range of data. Embodiments may record similar measurements for other metrics, such as CPU utilization, network utilization, disk queue length and so forth.

At operation 1304, embodiments may analyze workload distribution by constructing a histogram based on the counts. At operation 1306, one or more split point determinations may be made. Embodiments may determine split points by finding local maxima within the histogram and locating split points at the peaks of the local maxima. Other embodiments may determine split points by finding points in the histogram which creates segments between the split points in which total workload is approximately balanced.

At operation 1308, one or more non-voting members may be added to a fan-out member group. Based on the split point determinations, the new non-voting members may be designated to process read requests corresponding to horizontal partitions based on the split points. Embodiments may do full replication between a quorum member group, but process read requests as if a true horizontal partitioning scheme was in place. Items may then be replicated to the new non-voting members according to the split points, as indicated by operation 1310. For example, if there is a single split point, everything on one side of a split point might be replicated to one partition, while everything on the other side might be replicated to a different partition.

An embodiment may also be extended to adjust provisioned capacity in response to hotspots. Provisioned capacity may be described as involving a maximum amount of capacity that may be utilized to perform operations on a partition. It may be measured in various terms, such as transactions per second, amount of data received or set, various capacity-related metrics and so forth. A customer of a distributed DBMS may purchase a defined amount of capacity for a table, which may then be divided among the table's partitions. Embodiments may adjust the amount of capacity allocated to each partition based on hotspots.

The technique described above may be applied to write transactions as well as read transactions to determine hotspot locations. It may be possible to partition data according to detected hotspot locations using buckets representative of a range within a table, as described above. However, for write operations the workload may be concentrated on a particular location, such as the most recent date. In such cases, embodiments may employ techniques such as those depicted in FIG. 4 to accommodate increased write workload, rather than partitioning based on split points. Concentration of workload within a bucket may be used in such cases to determine which fan-out groups should be configured to have additional fan-out partitions.

Figure 14:
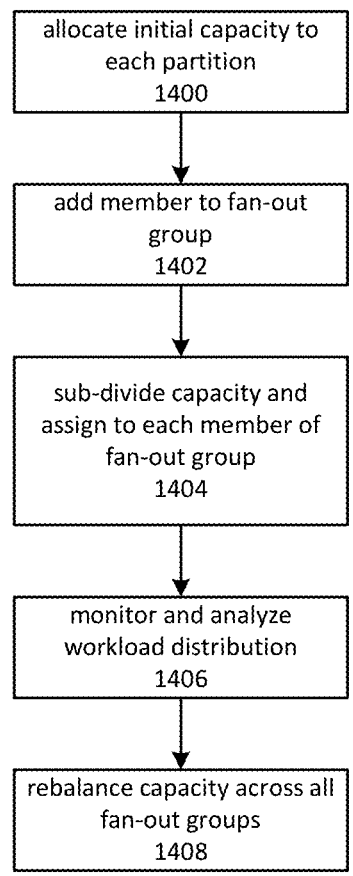
FIG. 14 is a flowchart depicting initial and subsequent allocation of provisioned capacity among fan-out groups.

FIG. 14 depicts allocating and reallocating capacity to partitions based on hotspot analysis. Although depicted as a sequence of operations, those of ordinary skill in the art will appreciate that the depicted operations may be altered, omitted, reordered or performed in parallel.

At operation 1400, an initial amount of capacity may be allocated to each partition. This may be based, for example, on a total amount of capacity purchased by a customer for performing operations on a table hosted by a distributed DBMS. The total capacity may be divided by the number of table partitions to be created and the result assigned to each partition. Alternatively, a predictive model or other technique may be used to assign capacity to each of the partitions.

At operation 1402, a member may be added to a fan-out group. For write operations, this may comprise adding a fan-out partition to share in the processing of write-related workload. For read-operations, the new addition to the fan-out group may be a non-voting member that replicates items from the primary partition by creating versions of the items in the new partition and then shares in the processing of read-related workload. Embodiments may enforce limits on capacity utilization at the partition level. Accordingly, these embodiments may assign a share of the capacity allocated to the preexisting members of a fan-out group to the new member.

Operation 1404 depicts assigning a share of capacity to the new member of a fan-out group and reallocating capacity assigned to other members of the same fan-out group. For example, assume that a table has been split into two partitions, each of which is initially allocated one-half of total provisioned capacity. Each partition may correspond to a fan-out group, which initially may contain no members other than the corresponding table partitions. If a new member is added to one of the fan-out groups, capacity may be subdivided between the members of the group. The parent partition may be allocated one-fourth of total capacity, and the new member partition allocated the remaining one-fourth.

Because of the tendency for range queries and natural ordering of data to create hotspots, embodiments may allocate capacity unevenly between partitions. For example, in time series data the partition handling the most recent set of data may need to process a greater amount of workload than other partitions. However, if capacity is allocated between partitions evenly, there may be insufficient capacity on the "hot" partition even when the customer is not utilizing the full amount of capacity allocated to it.

Operation 1406 depicts monitoring and analyzing distribution of workload handled by the partitions. Capacity utilization may be measured on a per-partition basis and compared to other partitions. Partitions that handle disproportionally large amounts of workload over time may be allocated a greater share of provisioned throughput. Embodiments may use various techniques to prevent transient spikes in usage from skewing the results. However, if a hotspot is detected, capacity may be rebalanced across fan-out groups to reflect the imbalanced workload, as depicted by operation 1408. As an example, assume that there are two fan-out groups, the second of which handles three-fourths of the total workload. Allocated capacity could be rebalanced by assigning one-fourth of the total capacity to the first fan-out group, and three-fourths of the total capacity to the second. If the second group has two members, each may be allocated three-eighths of the total capacity.

A similar approach may be applied when there is uneven distribution of workload within a fan-out group. Each member of a fan-out group may be assigned a share of the capacity allocated to the fan-out group, in proportion to the workload processed by each member of the group. Embodiments may for example employ this technique in conjunction with partitioning among non-voting members of a fan-out group, as described herein.

Embodiments of the present disclosure may be employed in conjunction with many types of DBMSs. A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put and get and so forth. Interaction with the database may also be based on various protocols or standards, such as hypertext markup language ("HTML") and extended markup language ("XML"). A DBMS may comprise various architectural components, such as a storage engine that acts to store data one on or more storage devices such as solid-state drives.

Figure 15:
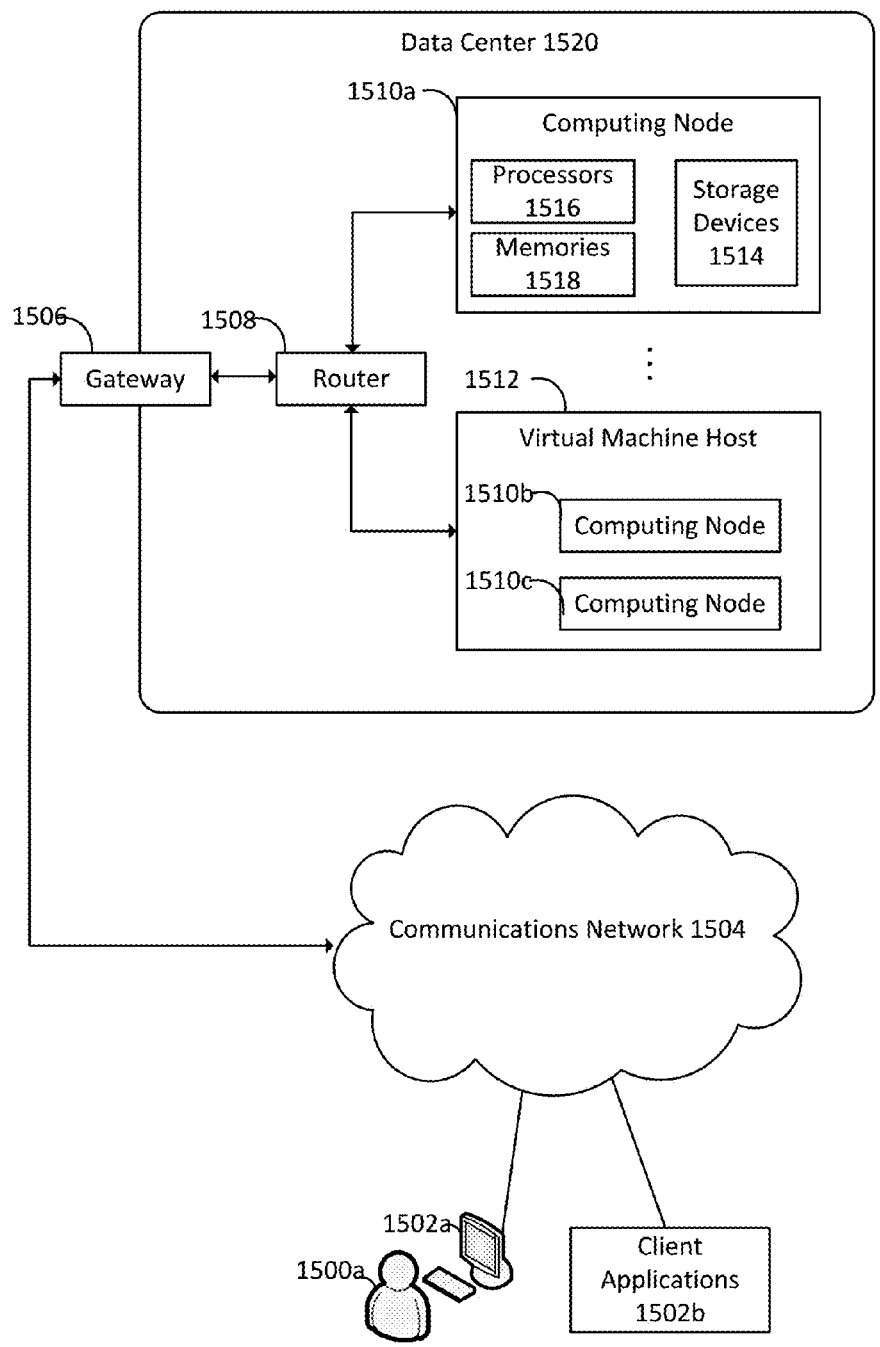
FIG. 15 is a block diagram depicting an embodiment of a computing environment in which aspects of the present disclosure may be practiced.

FIG. 15 is a diagram depicting an example of a distributed computing environment on which aspects of the present invention may be practiced. Various users 1500*a* may interact with various client applications, operating on any type of computing device 1502*a*, to communicate over communications network 1504 with processes executing on various computing nodes 1510*a*, 1510*b* and 1510*c* within a data center 1520. Alternatively, client applications 1502*b* may communicate without user intervention. Communications network 1504 may comprise any combination of communications technology, including the Internet, wired and wireless local area networks, fiber optic networks, satellite communications and so forth. Any number of networking protocols may be employed.

Communication with processes executing on the computing nodes 1510*a*, 1510*b* and 1510*c*, operating within data center 1520, may be provided via gateway 1506 and router 1508. Numerous other network configurations may also be employed. Although not explicitly depicted in FIG. 15, various authentication mechanisms, web service layers, business objects or other intermediate layers may be provided to mediate communication with the processes executing on computing nodes 1510*a*, 1510*b* and 1510*c*. Some of these intermediate layers may themselves comprise processes executing on one or more of the computing nodes. Computing nodes 1510*a*, 1510*b* and 1510*c*, and processes executing thereon, may also communicate with each other via router 1508. Alternatively, separate communication paths may be employed. In some embodiments, data center 1520 may be configured to communicate with additional data centers, such that the computing nodes and processes executing thereon may communicate with computing nodes and processes operating within other data centers.

Computing node 1510*a* is depicted as residing on physical hardware comprising one or more processors 1516, one or more memories 1518 and one or more storage devices 1514. Processes on computing node 1510*a* may execute in conjunction with an operating system or alternatively may execute as a bare-metal process that directly interacts with physical resources such as processors 1516, memories 1518 or storage devices 1514.

Computing nodes 1510*b* and 1510*c* are depicted as operating on virtual machine host 1512, which may provide shared access to various physical resources such as physical processors, memory and storage devices. Any number of virtualization mechanisms might be employed to host the computing nodes.

The various computing nodes depicted in FIG. 15 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for storing and retrieving data, the system comprising:
    a first computing node comprising a first one or more storage devices, the first one or more storage devices having stored thereon a first plurality of items corresponding to a first range of a table;
    a second computing node comprising a second one or more storage devices, the second one or more storage devices having stored thereon a second plurality of items corresponding to a second range the table; and
    one or more memories having stored thereon computer-readable instructions that, upon execution, cause the system at least to:
        receive information indicative of a first amount of work performed by the first computing node, the first amount of work based at least in part on retrieving one or more items of the first plurality of items corresponding to the first range;
        receive information indicative of a second amount of work performed by the second computing node, the second amount of work based at least in part on retrieving one or more items of the second plurality of items corresponding to the second range;
        configure the system, based at least in part on determining that the first amount of work is greater than the second amount of work, to replicate at least one item in the first plurality of items by storing a version of the at least one item on a third computing node; and
        process at least one request to retrieve the at least one item by accessing the version of the at least one item on the third computing node.

2. The system of claim 1, further comprising one or more memories having stored thereon computer-readable instructions that, upon execution, cause the system at least to:
    determine to stop accessing the third computing node, based at least in part on a third amount of work performed by the third computing node.

3. The system of claim 1, further comprising one or more memories having stored thereon computer-readable instructions that, upon execution, cause the system at least to:
    select, based at least in part on one of random selection or round-robin selection, the third computing node to process the request.

4. The system of claim 1, further comprising:
    the first computing node and at least one additional computing node configured to participate in quorum decisions.

5. The system of claim 1, further comprising one or more memories having stored thereon computer-readable instructions that, upon execution, cause the system at least to:
    replicate, on the third computing node, a subset of the first plurality of items corresponding to a subset of the first range.

6. A computer-implemented method for storing and retrieving data, the method comprising:
    receiving, by a computer, information indicative of a first amount of work performed by a first computing node while processing requests to retrieve a first plurality of items corresponding to a first range of a table;
    receiving, by the computer, information indicative of a second amount of work performed by a second computing node while processing requests to retrieve a second plurality of items corresponding to a second range of the table;

determining, based at least in part on the first amount of work being greater than the second amount of work, to replicate a first item of the first plurality of items by storing a version of the first item on a third computing node; and processing at least one request of a plurality of requests to retrieve the item by accessing the item on the third computing node.

7. The method of claim 6, further comprising:
determining to stop accessing the third computing node, based at least in part on a third amount of work performed by the third computing node.

8. The method of claim 6, further comprising:
selecting the third computing node to process the at least one request, the selecting based at least in part on one of random selection or round-robin selection.

9. The method of claim 6, further comprising:
maintaining at least one value indicative of a subset of the first amount of work performed, the subset of the first amount of work performed corresponding to a subset of the first range.

10. The method of claim 9, further comprising locating a split point in the first range of the table, based at least in part on the at least one values.

11. The method of claim 10, further comprising replicating data on one side of the split point from the first computing node to the third computing node.

12. The method of claim 6, further comprising:
determining to process on the third computing node the at least one request to retrieve the item based at least in part on a metadata catalog.

13. The method of claim 6, further comprising:
determining to process on the third computing node a second request to retrieve a second item, based at least in part on a probability that the second item has been replicated to the third computing node.

14. A non-transitory computer-readable storage medium having stored thereon instructions that, upon execution by a computing device, cause the computing device at least to:
receive information indicative of a first amount of work performed by a first computing node while processing requests to retrieve a first plurality of items corresponding to a first range of a table;
receive information indicative of a second amount of work performed by a second computing node while processing requests to retrieve a second plurality of items corresponding to a second range of the table;
determine based at least in part on the first amount of work being greater than the second amount of work, to replicate a first item of the first plurality of items by storing a version of the first item on a third computing node; and
determine to process at least one request to retrieve the item by accessing the item on the third computing node.

15. The computer-readable medium of claim 14, wherein the first amount of work corresponds to a unit of time.

16. The computer-readable medium of claim 14, having stored thereon further instructions that, upon execution by the computing device, cause the computing device at least to:
maintain at least one value indicative of a subset of the first amount of work performed, the subset of the first amount of work performed corresponding to a subset of the first range.

17. The computer-readable medium of claim 14, wherein the information indicative of the first amount of work is based at least in part on a predictive model.

18. The computer-readable medium of claim 14, having stored thereon further instructions that, upon execution by the computing device, cause the computing device at least to:
add information indicative of the third computing node to a metadata catalog.

19. The computer-readable medium of claim 14, having stored thereon further instructions that, upon execution by the computing device, cause the computing device at least to:
generate a hotspot notification based at least in part on the first amount of work.

20. The computer-readable medium of claim 14, having stored thereon further instructions that, upon execution by the computing device, cause the computing device at least to:
determine to stop accessing the third computing node, based at least in part on a third amount of work performed by the third computing node.

* * * * *